(12) United States Patent
Herzinger et al.

(10) Patent No.: US 8,983,413 B2
(45) Date of Patent: Mar. 17, 2015

(54) COMMUNICATION DEVICE INCLUDING MULTIPLE LO RECEIVERS

(75) Inventors: Stefan Herzinger, Sauerlach (DE); Volker Neubauer, Linz (AT)

(73) Assignee: Intel Mobile Communications GmbH, Neubiberg (DE)

( * ) Notice: Subject to any disclaimer, the term of this patent is extended or adjusted under 35 U.S.C. 154(b) by 385 days.

(21) Appl. No.: 12/957,507

(22) Filed: Dec. 1, 2010

(65) Prior Publication Data
US 2012/0142300 A1 Jun. 7, 2012

(51) Int. Cl.
H04B 7/08 (2006.01)
H04B 1/26 (2006.01)
H04B 1/00 (2006.01)
H04L 27/38 (2006.01)

(52) U.S. Cl.
CPC .............. H04B 1/26 (2013.01); H04B 1/0064 (2013.01); H04L 27/3854 (2013.01); H04L 27/3872 (2013.01)
USPC ........ 455/132; 455/67.3; 455/234.1; 455/255

(58) Field of Classification Search
CPC ....... H03D 3/007; H03D 3/006; H03D 3/009; H03D 7/00; H03D 7/08; H03D 7/168
USPC ..................................................... 455/132
See application file for complete search history.

(56) References Cited

U.S. PATENT DOCUMENTS

| | | | |
|---|---|---|---|
| 6,940,916 B1* | 9/2005 | Warner et al. | 375/261 |
| 7,486,941 B2* | 2/2009 | Rahman et al. | 455/234.1 |
| 7,567,611 B2* | 7/2009 | Chien | 375/219 |
| 7,580,481 B2 | 8/2009 | Khoini-Poorfard | |
| 2005/0243949 A1* | 11/2005 | Khoini-Poorfard | 375/324 |
| 2007/0207760 A1* | 9/2007 | Kavadias et al. | 455/255 |
| 2008/0003954 A1* | 1/2008 | Matsuno | 455/88 |

FOREIGN PATENT DOCUMENTS

CN 101218749 A 7/2008

OTHER PUBLICATIONS

Office Action dated Aug. 28, 2014 for co-pending Chinese Application No. 201110462103.6.

* cited by examiner

*Primary Examiner* — Ajibola Akinyemi
(74) *Attorney, Agent, or Firm* — Eschweiler & Associates, LLC

(57) ABSTRACT

Some embodiments of the present disclosure relate to multi-band receivers that include at least one divider unit having a divisor that is other-than-two. For example, in some embodiments the divisor is an odd integer (e.g., three). Such divisors allow oscillators for respective receiver subunits in a multi-band receiver to have frequencies that are sufficiently different from one another so as to limit cross-talk interference there between, even when the receiver subunits are concurrently receiving data on adjacent channels. To facilitate this other-than-two divisor, a phase error compensation block is often used to compensate for the effects of using the other-than-two divisor.

24 Claims, 4 Drawing Sheets

COMMUNICATION DEVICE INCLUDING MULTIPLE LO RECEIVERS

BACKGROUND

In many applications, a single communications device (e.g., a digital radio handset or a mobile phone) is expected to concurrently receive data over multiple channels. For example, some digital radio handsets include multiple hardware subunits for concurrently demodulating two independent streams of I/O data. Examples of communication standards that can make use of such functionality include the 3G Dual Cell High Speed Downlink Packet Access standard (DC-HSDPA) and the 2G EDGE Evo Down Link Dual Carrier standard (2G DLDC), among others.

In an attempt to concurrently receive data over multiple channels, some conventional communication devices include separate first and second I/O receiver subunits. A first local oscillator (LO) signal generator provides a first pair of LO signals to the first I/O receiver subunit, wherein the first pair of LO signals share a common frequency but are phase-shifted by 90° relative to one another. Similarly, a second LO signal generator provides a second pair of LO signals to the second I/O receiver subunit, wherein the second pair of LO signals also share a common frequency and are also phase-shifted by 90° relative to one another. Although such conventional communication devices may be sufficient in some arenas, cross-talk between the receiver subunits can seriously degrade quality of reception in at least two cases.

First, cross-talk can arise when a first oscillator, which is used to generate the first pair of LO signals for the first receiver subunit, is tuned closely to a second oscillator, which is used to generate the second pair of LO signals for the second receiver subunit. For example, cross-talk can arise when the first and second receivers receive data streams on adjacent 2G channels (e.g., first receiver receives a wanted radio frequency (RF) signal at 2 GHz, and second receiver receives a wanted RF signal at 2 GHz+200 kHz). In this situation, the first and second oscillators deliver nearly the same frequency (e.g., 4 GHz, and 4 GHz+400 KHz, respectively) to first and second divide-by-two frequency dividers, respectively. The close proximity of these oscillation frequencies can generate crosstalk between the receiver subunits making accurate down conversion/demodulation difficult.

Second, cross-talk can also occur when a harmonic frequency used in one receiver subunit is close to the wanted RF frequency (or a harmonic frequency) used in the other receiver subunit. For example consider a receiver where the oscillator supplying the LO signals to the first I/O receiver oscillates at a frequency of 200 MHz (and hence has harmonic frequencies at 400 MHz, 600 MHz, 800 MHz, and so on). If the wanted RF signal for the second I/O receiver has a frequency of 400 MHz, a harmonic frequency from the first I/O receiver can degrade the signal on the second I/O receiver, or vice versa, thereby impeding accurate reception of data.

Therefore, in view of the shortcomings of conventional multi-band receivers within mobile phones and other communication devices, the inventors have devised improved receivers that limit signal degradation due to crosstalk between reception units.

DETAILED DESCRIPTION

Figure 1:
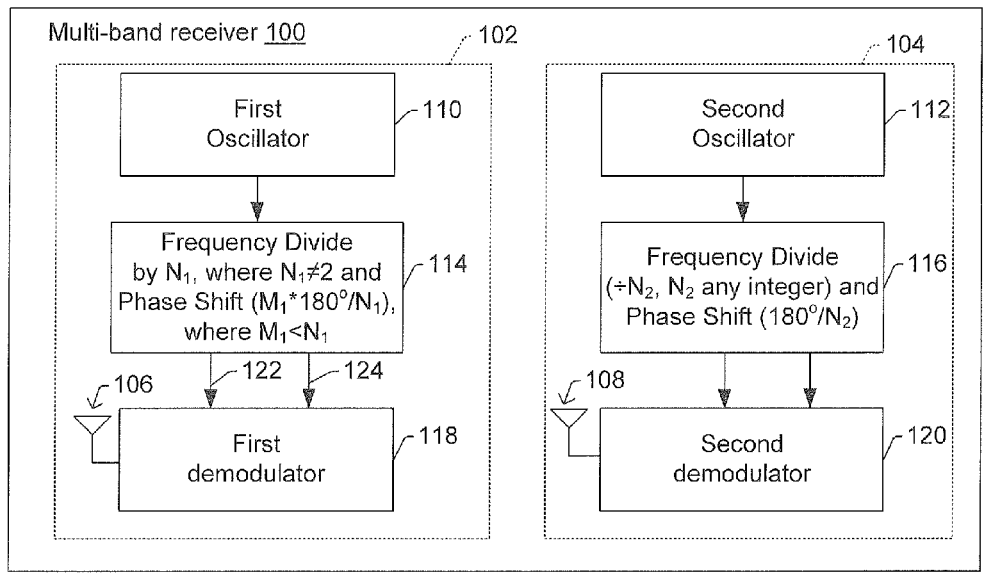
FIG. 1 is a block diagram illustrating a multi-band receiver in accordance with some embodiments.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details.

In contrast to a conventional multi-band receiver where only dividers having a divisor of two are used, some embodiments of the present disclosure relate to multiband receivers that include at least one frequency divider having a divisor of other-than-two. For example, in some embodiments a frequency divider can have a divisor that is an odd integer, such as three. Such divisors allow oscillators for respective receiver subunits in a multi-band receiver to have frequencies that are sufficiently different from one another so as to limit cross-talk interference there between, even when the receiver subunits are concurrently receiving data on adjacent channels. As will be appreciated in more detail below, to facilitate this other-than-two divisor, a phase error compensation block is often used to compensate for the phase offset from 90° caused by the other-than-two divisor.

Referring now to FIG. 1, one can see a multiband receiver 100 in accordance with some embodiments. The illustrated receiver 100 includes first and second receiver subunits 102, 104, respectively, which can be used to receive first and second streams of data over first and second RF antennas 106, 108, respectively. The first and second receiver subunits 102, 104 include first and second oscillators (110, 112, respectively), first and second dividers (114, 116, respectively); and first and second demodulation units (118, 120, respectively).

Notably, rather than having a divider with a divisor of two as in conventional communication devices, at least the first divider 114 has a divisor of $N_1$, wherein $N_1$ is an integer value and $N_1$ is not an integer multiple of two (e.g., $N_1 \neq 2, 4, 6, 8, \ldots$) Thus, the first divider 114 reduces the oscillation frequency of the first oscillator 110 by $N_1$, and also induces a predetermined phase-shift of $M_1 * 180°/N_1$ between a first LO signal 122 and a first phase-shifted LO signal 124, where $M_1 < N_1$. $M_1$ determines the phase shift between the first LO signal 122 and first phase-shifted LO signal 124 by counting the clock edges of the oscillator signal from oscillator 110. In one example, $M_1 = 1$ and $N_1 = 3$, such that a predetermined phase shift of 60° is provided between LO signals 122, 124. To compensate for the predetermined phase shift of $M_1 * 180°/N_1$ and its offset from 90°, a phase error compensation block is often included in the first demodulator 118 (e.g., see FIGS. 3-4 further herein).

To limit interference between the receiver subunits 102, 104, the second divider 116 often has a divisor $N_2$ that differs from divisor $N_1$. As will be appreciated in more detail below, relative to conventional systems, using different divisors allows the oscillation frequencies of the first and second oscillators 110, 112 to be spaced further apart than previous implementation. Further, using one divisor that is even and another divisor that is odds helps to limit interference due to harmonics, because the associated harmonics of the even and odd divisors overlap relatively infrequently.

Figure 2:
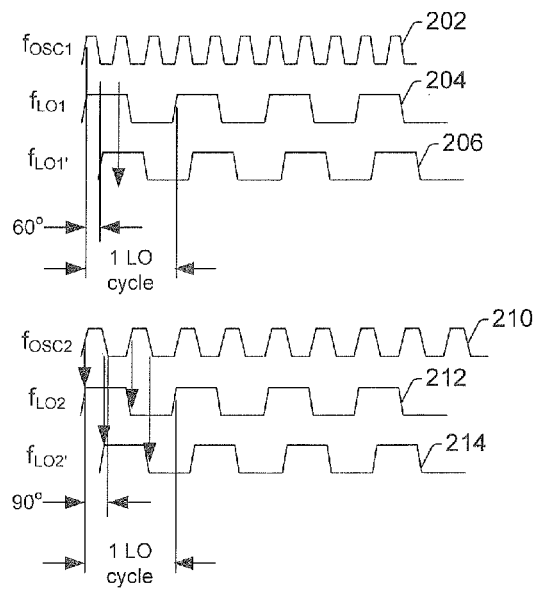
FIG. 2 is a set of timing diagrams illustrating one example of frequency divider functionality.

FIG. 2 shows a pair of timing diagrams illustrating one example of how first and second frequency dividers (e.g., 114, 116 in FIG. 1) can each provide a pair of phase shifted LO signals. In the top half of FIG. 2, one can see an example of how a first divider (e.g., divider 114 in FIG. 1) having a divisor of three (e.g., $N_1=3$, $M_1=1$) can function. As shown, the first divider receives a first oscillator signal 202 having frequency $f_{OSC1}$, and "counts" consecutive edges of the first oscillator signal 202. A first LO signal 204 (e.g., 122 in FIG. 1) changes state each time the count reaches three, as measured from a rising edge of the first oscillator signal 202. A first phase-shifted LO signal 206 (e.g., 124 in FIG. 1) also changes state each time the count reaches three, however, it is measured from a falling edge of the first oscillator signal 202. In this way, a first LO signal 204 and first phase-shifted LO signal 206 are provided with the same frequency (e.g., $\frac{1}{3}*f_{OSC1}$) and with a phase shift there between (e.g., 1*180°/3=60°).

For comparison, the bottom half of FIG. 2 shows how a second divider (e.g., divider 116 in FIG. 1) having a divisor of two (e.g., $N_2=2$), such as used in an I/O modulator, can function. As shown, the second divider receives a second oscillator signal 210 having frequency $f_{OSC2}$, and "counts" consecutive edges of the second oscillator signal 210. A second LO signal 212 changes state each time the count reaches two, as measured from a rising edge of the second oscillator signal 210. A second phase-shifted LO signal 214 also changes state each time the count reaches two, however, it is measured from a falling edge of the second oscillator signal 210. In this way, the second LO and second phase-shifted signals share a common frequency (e.g., $\frac{1}{2}/*f_{OSC2}$) and have a 90° phase shift there between.

Figure 3:
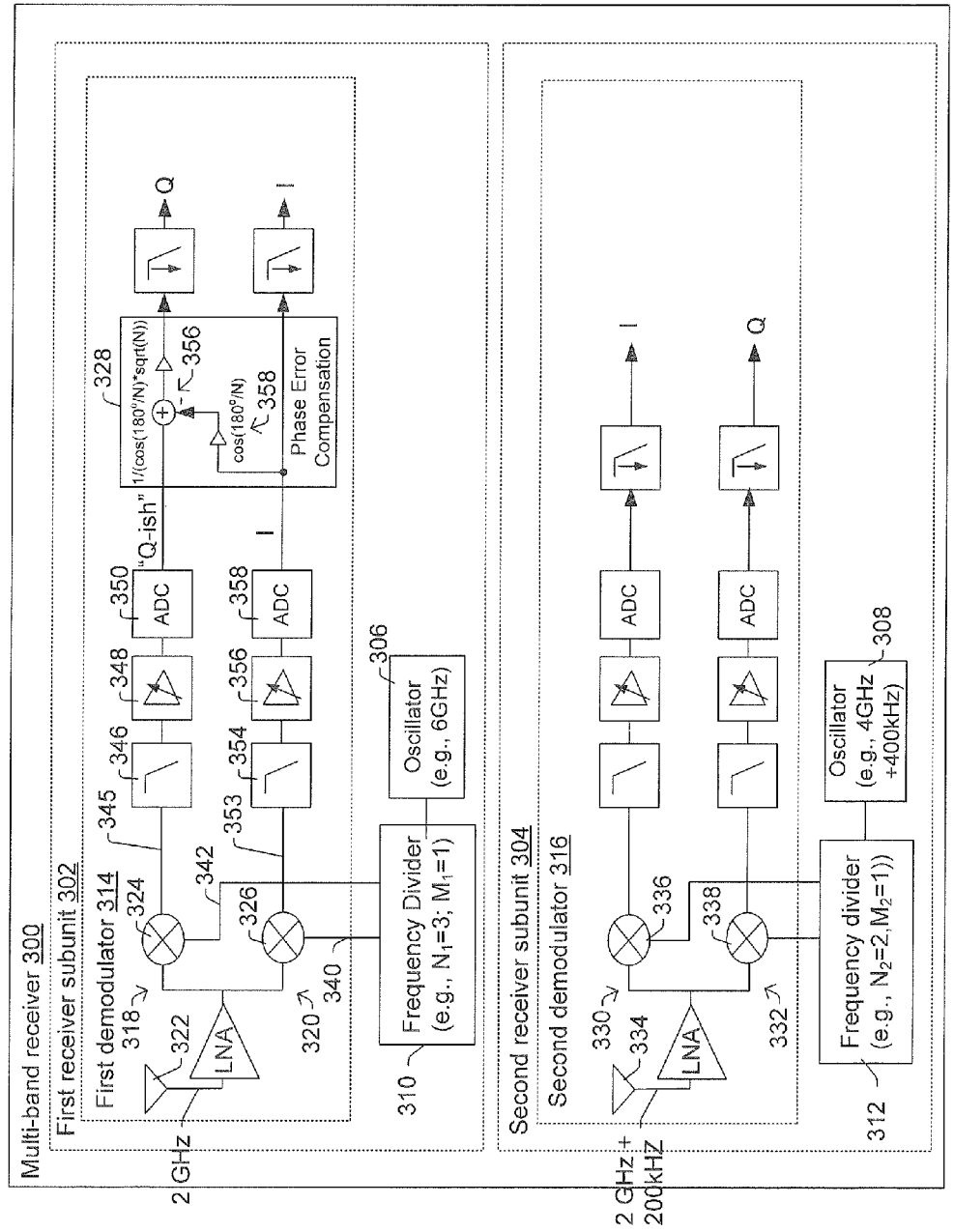
FIG. 3 is a block diagram illustrating another multi-band receiver in accordance with some embodiments.

Turning now to FIG. 3, one can see another embodiment of a multi-band receiver 300 in accordance with some embodiments. Like FIG. 1's embodiment, FIG. 3's embodiment includes first and second receiver subunits 302, 304, respectively. The first and second receiver subunits 302, 304 include first and second oscillators (306, 308, respectively), first and second frequency dividers (310, 312, respectively), and first and second demodulators (314, 316, respectively). The first demodulator 314 includes first and second reception paths 318, 320 stemming from a first RF antenna 322. First and second mixers 324, 326 are disposed on the first and second reception paths 318, 320, respectively. A phase error compensation block 328 is disposed downstream of the first and second mixers 324, 326 in the first demodulator. The second demodulator 316 includes third and fourth reception paths 330, 332 stemming from a second RF antenna 334. Third and fourth mixers 336, 338 are disposed on the third and fourth reception paths 330, 332, respectively.

For purposes of illustration, this embodiment is discussed below with respect to an example where first and second receiver subunits 302, 304 receive separate data streams on adjacent 2G channels (e.g., 2 GHz, and 2 GHz plus 200 KHz, respectively). It will be appreciated that in typical embodiments, the channels over which data streams are received change over time and, consequently this example merely represents a snapshot of the multiband receiver 300 in time. For further purposes of illustration in this example, the first frequency divider 310 is discussed as having a divisor of three (e.g., $M_1=1$; $N_1=3$), and the second frequency divider 312 is discussed as having a divisor of two (e.g., $N_2=2$). It will be appreciated that the numerical values discussed herein are not limiting in any way, but merely serve to illustrate one practical context in which the multi-band receiver can be used.

Because the first receiver subunit 302 includes a divider 310 having a divisor of three and expects to receive a wanted RF signal at 2 GHz over antenna 322, the first oscillator 306 is configured to provide an oscillator signal having a frequency of 6 GHz. The first divider 310, which has a divisor $N_1=3$ in this example, simultaneously cuts the 6 GHz frequency to 2 GHz and simultaneously provides a 60° phase shift between the first LO signal 340 and first phase-shifted LO signal 342. Thus, both the first LO signal 340 and the first phase-shifted LO signal 342 have a frequency of 2 GHz, and are phase-shifted by 60° relative to each other.

The first and second mixers 324, 326 mix the 2 GHz wanted RF signal from the antenna 322 with the first phase-shifted LO signal 342 and first LO signal 340, respectively. The first mixer 324 provides a first mixed signal 345 (having frequency components at 4 GHz and at baseband), and a low-pass filter 346 blocks the 4 GHz components so the baseband component is passed there through. The baseband component is then amplified by amplifier 348, and converted to a digital signal by analog to digital converter (ADC) 350. Similarly, the second mixer 326 provides a second mixed signal 353 (having frequency components at 4 GHz and at baseband), and a low-pass filter 354 blocks the 4 GHz component so the baseband component is passed there through. The baseband component is then amplified by amplifier 356, and converted to a digital signal by analog to digital converter (ADC) 358.

Because the signals on the first reception path 318 are phase-shifted by 60° relative to the signals on the second reception path 320, the phase error compensation block 328 maps the 60° phase shifted data ("Q-ish") to an orthogonal coordinate system (e.g., 90° phase shift). In the illustrated example, the 60° phase shifted channel from ADC 350 is composed of an i-signal (e.g., cosine 60°=0.5) and a Q-signal (e.g., sine 60°=0.5*sqrt(3)). Thus, in this example, the first mixed signal 345 can be made orthogonal to the second mixed signal 353 by subtracting 0.5 times the first mixed signal from the second mixed signal (e.g., at 356) and correcting the amplitude of the second mixed signal by multiplying by 1/(0.5*sqrt(3)) (e.g., at 358).

Because the second receiver unit 304 includes a divider 312 having a divisor of two and expects to receive a wanted RF signal at 2 GHz+200 KHz, the second oscillator 308 provides an oscillator signal having a frequency of 4 GHz+400 kHz to the second frequency divider 312. The second frequency divider 312, which has a divisor $N_2=2$ in this example, simultaneously cuts the 4 GHz+400 kHz frequency to 2 GHz+200 kHz to down convert the wanted signal from the second RF antenna 344. Hence, using a divisor of three for the first divider 310 in combination with a divisor of two for the second divider 312 helps to prevent cross-talk, because the oscillator frequencies provided by the first and second oscillators 306, 308, respectively, are now spaced apart much further than in conventional systems using a first and second I/O modulators. Specifically, in the illustrated example, the first oscillator 306 has a frequency of 6 GHz and the second oscillator 308 has a frequency of 4 GHz+4 kHz, which tends to limit interference relative to conventional approaches.

Figure 4:
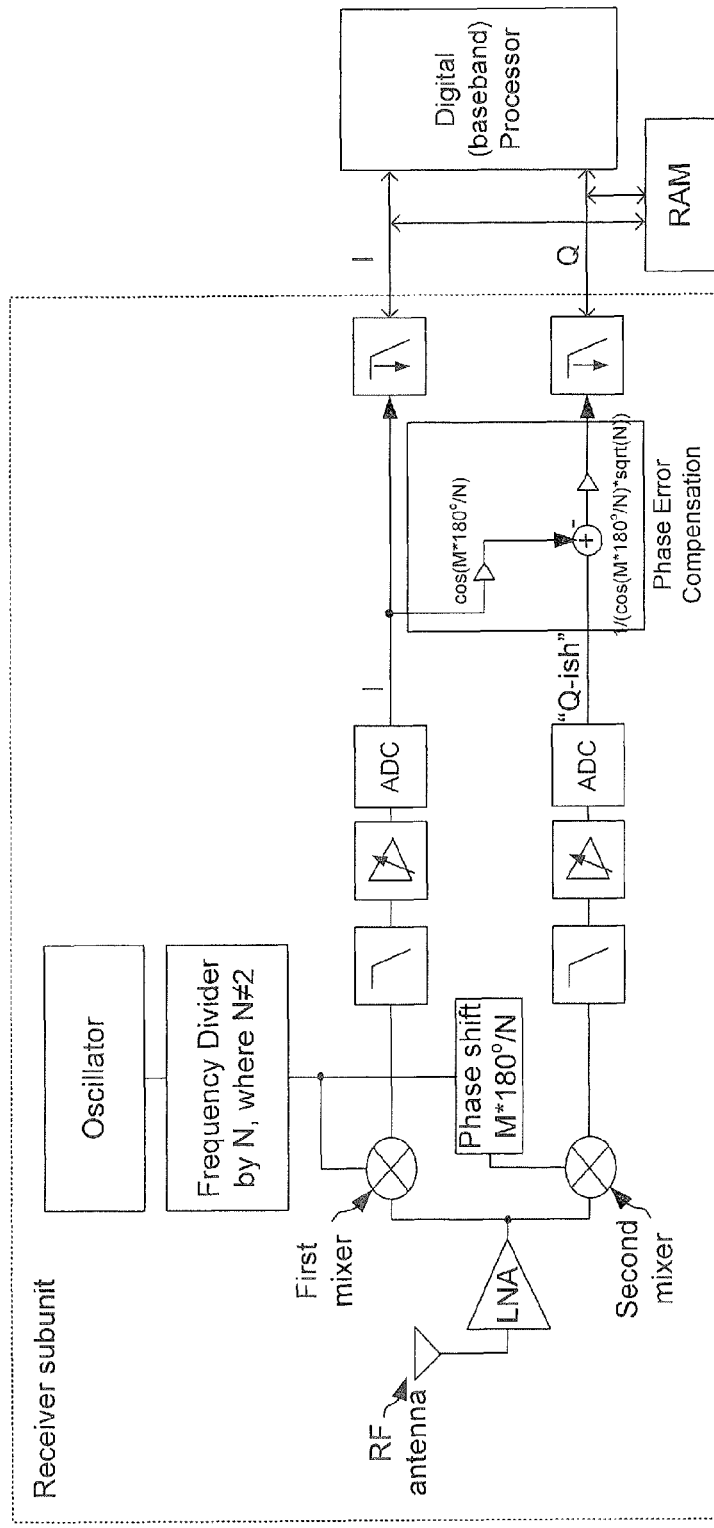
FIG. 4 is a block diagram illustrating another receiver in accordance with some embodiments.

FIG. 4 shows a standalone receiver subunit 400 that makes use of a divider having an other-than-two divisor and a corresponding other than 90° phase shift module. This standalone receiver is the same as the first receiver subunit 302 in FIG. 3, and is illustrated in standalone fashion to point out that the architecture disclosed is applicable to any type of receiver and is not limited to multiband receivers.

Figure 5:
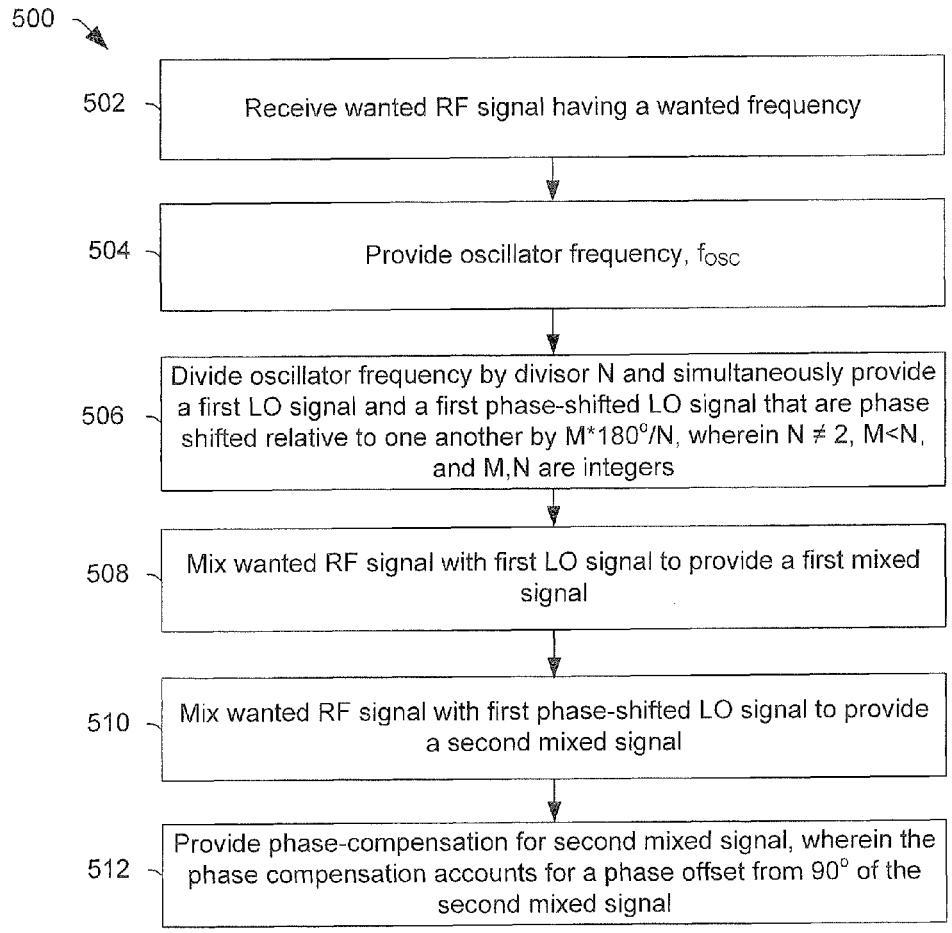
FIG. 5 is a flow chart depicting a method in accordance with some embodiments.

FIG. 5 shows a method in accordance with some embodiments of the present disclosure. While these methods are illustrated and described below as a series of acts or events, the present disclosure is not limited by the illustrated ordering of such acts or events. For example, some acts may occur in different orders and/or concurrently with other acts or events apart from those illustrated and/or described herein. In addition, not all illustrated acts are required and the waveform shapes are merely illustrative and other waveforms may vary significantly from those illustrated. Further, one or more of the acts depicted herein may be carried out in one or more separate acts or phases. It will also be appreciated that the communication devices previously illustrated in FIGS. 1-3 can include suitable hardware and/or software to implement these methods.

FIG. 5 method starts at 502 when a wanted RF signal having a wanted RF frequency is received over an RF antenna.

At 504, the method provides an oscillator frequency, $f_{OSC}$. Often, the oscillator frequency is an integer multiple of the wanted RF frequency.

At 506, the oscillator frequency, $f_{OSC}$, is divided by a divisor N/M. When this division occurs, a first LO signal and a first phase-shifted LO signal are generated. The first LO signal and first phase-shifted LO signal share a common frequency (e.g., $f_{OSC}$/N) and are phase-shifted relative to one another by M*180°/N, wherein N≠2 and M<N. Often, N is an odd integer. In some implementations the phase shift ranges between about 81° and about 99° due to parasitic effects leading to a deviation from the ideal 90°.

At 508, the method mixes the wanted RF signal with the first LO signal to provide a first mixed signal. The first mixed signal includes frequency at the sum and difference of the wanted RF signal and the first LO signal (and harmonics thereof).

At 510, the method mixes the wanted RF signal with the first phase-shifted LO signal to provide a second mixed signal. The second mixed signal includes frequency at the sum and difference of the wanted RF signal and the first phase-shifted LO signal (and harmonics thereof).

At 512, the method provides phase-compensation for the second mixed signal, wherein the phase compensation accounts for a phase offset from 90° of the second mixed signal.

It will be appreciated that the claims set forth below are not limited to the examples illustrated and described above in any way. For example, although the examples above described relate to so called "zero IF" receivers where wanted RF frequencies are converted directly down to the baseband in a single stage, in other embodiments the wanted RF signals can be converted down to an intermediate frequency (IF) before being converted down to baseband. Also, although specific examples of divisors were described above (e.g., examples where N=3), it will be appreciated that any integer value other-than-two is contemplated as falling within the scope of the present invention. For example, values of 4, 5, 6, 7, and so on could be chosen for divisors. Also, although the example multi-band receivers have been illustrated as having two receiver subunits, multiband receivers in accordance with this invention can be extended to any number of receiver subunits.

Although the disclosure has been shown and described with respect to one or more implementations, equivalent alterations and modifications will occur to others skilled in the art based upon a reading and understanding of this specification and the annexed drawings.

The disclosure includes all such modifications and alterations and is limited only by the scope of the following claims. In particular regard to the various functions performed by the above described components (e.g., elements and/or resources), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. In addition, the articles "a" and "an" as used in this application and the appended claims are to be construed to mean "one or more".

Furthermore, to the extent that the terms "includes", "having", "has", "with", or variants thereof are used in either the detailed description or the claims, such terms are intended to be inclusive in a manner similar to the term "comprising."

What is claimed is:

1. A receiver, comprising:
a first signal generator configured to generate a first local oscillator (LO) signal and a first phase-shifted LO signal, wherein the first LO signal and first phase-shifted LO signal both oscillate at a first LO frequency, and phase shift the first LO signal and first phase-shifted LO signal relative to one another by a first predetermined phase shift, wherein the first signal generator comprises a first oscillator configured to provide a first oscillation signal having a first oscillation frequency, and a first frequency divider, having an odd division ratio, configured to convert the first oscillation signal into the first LO signal and the first phase-shifted LO signal such that the first oscillation frequency is equal to the first LO frequency multiplied by an odd integer; and
a second signal generator configured to generate a second LO signal and a second phase-shifted LO signal, wherein the second LO signal and second phase-shifted LO signal both oscillate at a second LO frequency that differs from the first LO frequency, and phase shift the second LO signal and the second phase-shifted LO signal relative to one another by a second predetermined phase shift that is predetermined to be substantially different from the first predetermined phase shift.

2. The receiver of claim 1, wherein the first predetermined phase shift is about M*180°/N, wherein M and N are integers and wherein M is less than N.

3. The receiver of claim 2, wherein M=1 and N=3.

4. The receiver of claim 1, wherein the predetermined phase shift is between about 81° and about 99°.

5. The receiver of claim 1, further comprising:
a first radio frequency (RF) antenna on which a first RF signal is received, wherein first and second receive paths stem from the first RF antenna;
a first mixer located on the first receive path, wherein the first mixer is adapted to provide a first mixed signal based on the first LO signal and the first RF signal;
a second mixer located on the second receive path, wherein the second mixer is adapted to provide a second mixed signal based on the first phase-shifted LO signal and the first RF signal;
a phase compensation block downstream of the second mixer, wherein the phase compensation block adjusts the second mixed signal to compensate for the first predetermined phase shift of the first phase-shifted LO signal;

a second RF antenna on which a second RF signal is received, wherein third and fourth receive paths stem from the second RF antenna;

a third mixer located on the third receive path, wherein the third mixer is adapted to provide a third mixed signal based on the second LO signal and the second RF signal; and a fourth mixer located on the fourth receive path, wherein the fourth mixer is adapted to provide a fourth mixed signal based on the second phase-shifted LO signal and the second RF signal.

6. The receiver of claim 5, wherein the first signal generator comprises:

a first oscillator to provide a first oscillation signal having a first oscillation frequency; and a first frequency divider having an odd division ratio, wherein the first frequency divider converts the first oscillation signal into the first LO signal and the first phase-shifted LO signal such that the first oscillation frequency is equal to the first LO frequency multiplied by an odd integer.

7. The receiver of claim 6, wherein the second signal generator comprises:

a second oscillator to provide a second oscillation signal having a second oscillation frequency, wherein the second oscillation frequency is different than the first oscillation frequency; and a second frequency divider having an even division ratio, wherein the second frequency divider converts the second oscillation signal into the second LO signal and the second phase-shifted LO signal such that the second oscillation frequency is an even integer multiple of the second LO frequency.

8. The receiver of claim 1, wherein the second LO signal and second phase-shifted LO signal are phase shifted relative to one another by about 90°.

9. The receiver of claim 1, wherein the first signal generator generates the first LO signal and the first phase-shifted LO signal according to the first predetermined phase shift comprising 180°/N, wherein N is an integer that is different than 2.

10. The receiver of claim 1, wherein the first signal generator generates the first LO signal and the first phase-shifted LO signal according to the first predetermined phase shift comprising about 60° and the second signal generator generates the second LO signal and the second phase-shifted LO signal second according to the second predetermined phase shift comprising about 90°.

11. The receiver of claim 1, wherein the first signal generator generates the first LO signal with one phase shift and the first phase-shifted LO signal with a different phase that is a non-random and intended mismatch with respect to the one phase shift and a function of the first predetermined phase shift.

12. A multi-band receiver, comprising:

a signal generator configured to provide first and second local oscillator (LO) signals and first and second phase-shifted LO signals, wherein the first LO signal and the first phase-shifted LO signal both have a first LO frequency b-ut and are phase shifted relative to one another by a first predetermined phase shift, and wherein the second LO signal and the second phase-shifted LO signal both have a second LO frequency and are phase shifted relative to one another by a second pre-determined phase shift that is predetermined to be substantially different from the first predetermined phase shift, wherein the signal generator comprises a first oscillator configured to provide a first oscillation signal having a first oscillation frequency, and a first frequency divider having an odd division ratio, wherein the first frequency divider converts the first oscillation signal into the first LO signal and the first phase-shifted LO signal such that the first oscillation frequency is equal to the first LO frequency multiplied by an odd integer;

a first receiver subunit to down-convert a first radio frequency (RF) signal by using the first LO signal and the first phase-shifted LO signal; and a second receiver subunit to down-convert a second RF signal by using the second LO signal and the second phase-shifted LO signal.

13. The multi-band receiver of claim 12, wherein the signal generator further comprises:

a second oscillator to provide a second oscillation signal having a second oscillation frequency, wherein the second oscillation frequency is different than the first oscillation frequency; and a second frequency divider having an even division ratio, wherein the second frequency divider converts the second oscillation signal into the second LO signal and the second phase-shifted LO signal such that the second oscillation frequency is an even integer multiple of the second LO frequency.

14. The multi-band receiver of claim 12, wherein the first receiver subunit comprises:

a first mixer to mix the first RF signal with the first LO signal to provide a first mixed signal;

a second mixer to mix the first RF signal with the first phase-shifted LO signal to provide a second mixed signal; and a phase compensation block downstream of the second mixer, wherein the phase compensation block adjusts the second mixed signal to compensate for the pre-determined phase shift of the first phase-shifted LO signal.

15. The multi-band receiver of claim 14, wherein the second receiver subunit comprises:

a third mixer to mix the second LO signal with the second RF signal to provide a third mixed signal; and a fourth mixer to mix the second phase-shifted LO signal with the second RF signal to provide a fourth mixed signal.

16. The multi-band receiver of claim 12, wherein the first or the second pre-determined phase shift is a fixed value between about 9° and about 81°.

17. The multi-band receiver of claim 12, wherein the first or the second pre-determined phase shift is about 180°/N, wherein N is an odd integer.

18. The multi-band receiver of claim 12, wherein the signal generator generates the second LO signal and the second phase-shifted LO signal according to the predetermined phase shift comprising 180°/N, wherein N is an integer that is different than 2.

19. The multi-band receiver of claim 12, wherein the signal generator generates the second LO signal and the second phase-shifted LO signal according to the predetermined phase shift comprising 60°.

20. The multi-band receiver of claim 12, wherein the signal generator generates the second LO signal with one phase and the second phase-shifted LO signal with a different phase that is an intended mismatch with respect to the one phase shift.

21. A method, comprising:

receiving a first wanted RF signal having a first wanted RF frequency over a radio frequency (RF) antenna;

providing a first oscillator frequency;

dividing the first oscillator frequency by N to generate a first local oscillator (LO) signal and a first phase-shifted LO signal, wherein the first LO signal and the first phase-shifted LO signal share a common first frequency and are phase-shifted relative to one another by a first predetermined phase shift of M*180°/N that is predetermined to be substantially different from 90°, wherein M and N are integers, M<N, and M/N is other than ½;

mixing the first wanted RF signal with the first phase-shifted LO signal to provide a first mixed signal;

performing phase-compensation on the first mixed signal to account for a phase offset from 90° relative to the first LO signal;

receiving a second wanted RF signal having a second wanted RF frequency;

providing a second oscillator frequency that differs from the first oscillator frequency;

dividing the second oscillator frequency to generate a second (LO) signal and a second phase-shifted LO signal, wherein the second LO signal and the second phase-shifted LO signal share a common second frequency that is different from the common first frequency and are phase-shifted relative to one another by a second phase shift of approximately 90° that is substantially different from the first phase shift;

mixing the second wanted RF signal with the second LO signal to provide a third mixed signal;

mixing the second wanted RF signal with the second phase-shifted LO signal to provide a fourth mixed signal; and using the third and fourth mixed signals to retrieve a second digital bitstream present in the second RF wanted signal.

22. The method of claim 21, further comprising:

mixing the first wanted RF signal with the first LO signal to provide a second mixed signal; and using the first and second mixed signals to retrieve a first digital bitstream present in the first RF wanted signal.

23. The method of claim 21, wherein M is equal to 1 and N is equal to 3.

24. The method of claim 21, wherein the first LO signal comprises one phase and the first phase-shifted LO signal comprises a different phase that is an intended mismatch with respect to the one phase.

* * * * *

UNITED STATES PATENT AND TRADEMARK OFFICE
CERTIFICATE OF CORRECTION

| | |
|---|---|
| PATENT NO. | : 8,983,413 B2 |
| APPLICATION NO. | : 12/957507 |
| DATED | : March 17, 2015 |
| INVENTOR(S) | : Stefan Herzinger et al. |

It is certified that error appears in the above-identified patent and that said Letters Patent is hereby corrected as shown below:

In the Claims

Column 7, Claim 12, Line 60 Please replace "-quency b-ut and are..." with -- -quency and are...--

Signed and Sealed this
Sixteenth Day of June, 2015

Michelle K. Lee
*Director of the United States Patent and Trademark Office*